US006452872B1

(12) United States Patent
Teijido et al.

(10) Patent No.: US 6,452,872 B1
(45) Date of Patent: Sep. 17, 2002

(54) DEVICE FOR THE ORIENTED ILLUMINATION OF A SURFACE BY A MICROPRISM GUIDE

(75) Inventors: Juan Manuel Teijido, Auvernier; Jean-Charles Poli, Les Geneveys-sur-Coffrane; Joachim Grupp, Enges; Hans Peter Herzig, Neuchâtel, all of (CH)

(73) Assignee: Asulab S.A., Bienne (CH)

( * ) Notice: Subject to any disclaimer, the term of this patent is extended or adjusted under 35 U.S.C. 154(b) by 0 days.

(21) Appl. No.: 09/566,945

(22) Filed: May 8, 2000

(30) Foreign Application Priority Data

May 5, 1999 (CH) .............................................. 0860/99

(51) Int. Cl.[7] .............................. G02B 6/00; G04B 19/30
(52) U.S. Cl. ..................... 368/67; 368/232; 368/227; 349/62; 349/63; 353/38; 362/23; 362/26; 362/30; 362/31
(58) Field of Search ................... 368/67, 227; 353/38; 349/62, 63; 362/23, 26, 30, 31

(56) References Cited

U.S. PATENT DOCUMENTS

| 5,430,285 A | * | 7/1995 | Karpen et al. .............. 235/472 |
| 5,506,929 A | | 4/1996 | Tai et al. ..................... 385/146 |
| 5,555,109 A | * | 9/1996 | Zimmerman et al. ......... 353/38 |
| 5,598,280 A | * | 1/1997 | Nishio et al. ................. 349/62 |
| 5,894,539 A | * | 4/1999 | Epstein ........................ 349/62 |
| 5,984,485 A | * | 11/1999 | Poli et al. ..................... 368/67 |

FOREIGN PATENT DOCUMENTS

| GB | 2072894 | * | 2/1980 | ................. 368/227 |
| GB | 0 750 755 | | 8/1998 | |
| GB | 2 324 599 | | 10/1998 | |
| WO | WO96/23166 | | 8/1996 | |

* cited by examiner

Primary Examiner—Bernard Roskoski
Assistant Examiner—Jeanne-Marguerite Goodwin
(74) Attorney, Agent, or Firm—Griffin & Szipl, P.C.

(57) ABSTRACT

Solid optical guide (10) with microprisms (20) of refractive index n, for uniformly illuminating a surface (4) in grazing incidence at an angle $\theta_1$ in which a plane angle $\delta$ of the cross-section develops with respect to the surface (4) a substantially perpendicular face (15) and a substantially parallel face (14), in which microprisms (20) are structured in hollows, one facet (21) of said microprisms oriented towards the face (15) has its edge (22) formed with the parallel face (14) inclined at an angle $\vec{\alpha}$ with respect to the axis of the guide and its edge (23) formed with the perpendicular face (15) inclined at an angle $\vec{\gamma}$ with respect to the perpendicular to the surface to be illuminated, the values $\vec{\alpha}$ and $\vec{\gamma}$ being determined from characteristics n, $\theta_1$ and $\delta$ of the guide.

23 Claims, 5 Drawing Sheets

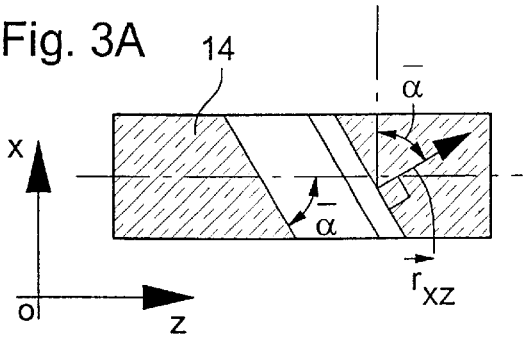
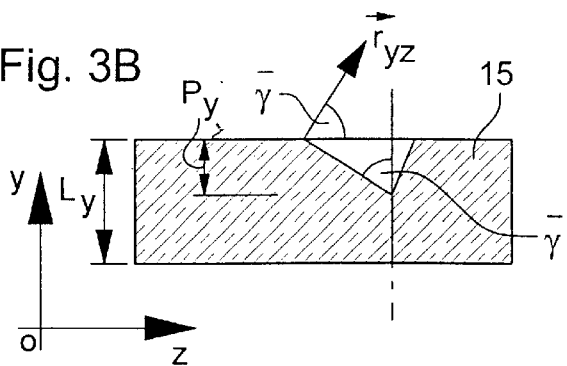
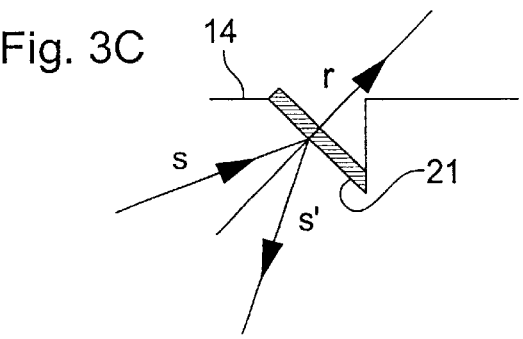
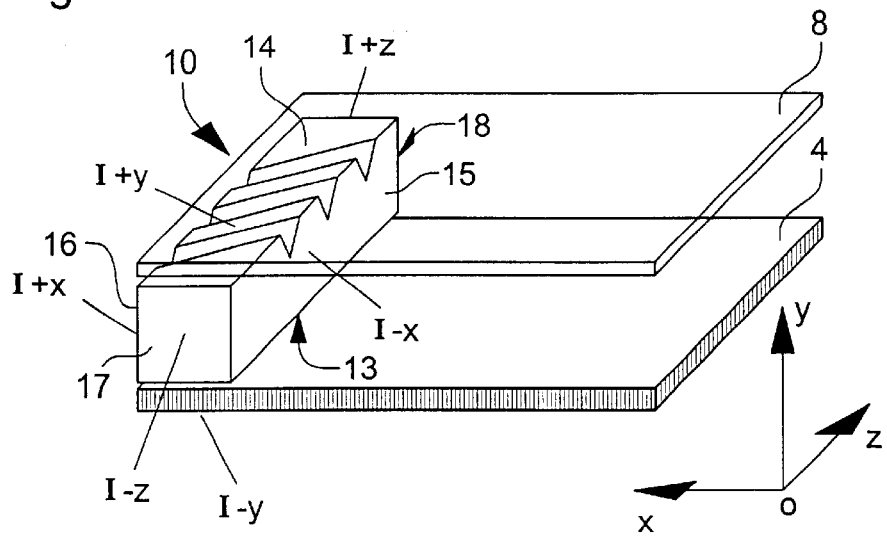
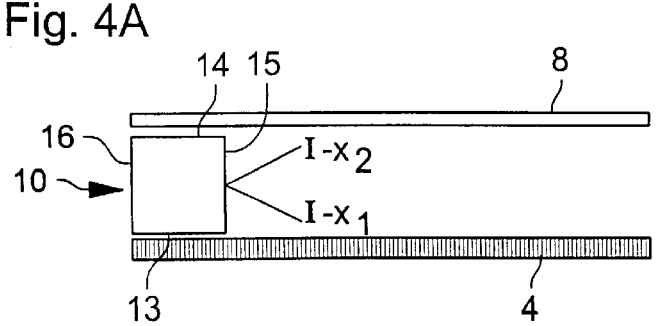

DEVICE FOR THE ORIENTED ILLUMINATION OF A SURFACE BY A MICROPRISM GUIDE

The present invention concerns a device for the oriented illumination of a flat surface by means of a solid optical guide, provided with microprisms a particular arrangement of which corrects the light rays originating from at least one source allowing said rays to be injected at least at one of its ends, so as to obtain along the entire length of the guide a uniform grazing emergence via a face directed towards said surface to be illuminated.

The invention concerns more particularly a device of this type for illuminating surfaces of small dimensions, such as display devices for measuring apparatus and timepiece dials.

Devices in which a surface is illuminated by an optical guide made of a flexible element, of a translucent material usually having a generally rectangular cross-section are already known. Such a guide allows the light injected at one end to be led along the guide by total internal reflection (TIR) and allows the rays which, inside the guide, strike the surface directed towards the surface to be illuminated, to be extracted to said surface to be illuminated at an angle less than the critical angle θc, whose value depends upon the refractive index n of the material used. In order to increase the number of rays corresponding to the aforecited criteria, it is also proposed to coat the other faces which are not directed towards the surface to be illuminated with a reflective white varnish. Such devices correspond for example to that which is disclosed in European Patent No. EP 0 860 755 for the artificial lighting of a timepiece dial by means of a diode. These devices have the drawback of having poor yield because of losses by absorption on the other walls, and having a luminous intensity which decreases progressively as one moves away from the light source.

In order to reduce the loss of light energy, various devices propose using microprisms which work either in reflection, or in transmission. When the microprisms are used in reflection, they are arranged on a surface of the guide which is perpendicular to its longitudinal line so as to return the incident rays by total internal reflection onto the opposite face through which the rays can emerge to illuminate a surface. When the microprisms are used in transmission, they are arranged perpendicular to the longitudinal line of the guide on the face though which the rays have to emerge to illuminate a surface. This latter configuration corresponds for example to the devices described in U.S. Pat. No. 5,555,109 and European Patent No. EP 0 666 247. Whether the microprisms are used in reflection or in transmission, it will be observed that they are always arranged on faces of the guide which are substantially perpendicular to the surface to be illuminated. In the case of a curved guide, and in particular in the case of a guide in the shape of a ring, the structuring of the microprisms is made more difficult technically, which naturally leads to an increase in the cost of the illumination device. It will also be observed that these devices of the prior art still do not provide a satisfactory solution to the orientation of the emerging rays towards the surface to be illuminated. Indeed, many rays go directly from the guide to the observer and dazzle him instead of illuminating the surface.

An object of the present invention is to overcome the drawbacks of the aforementioned prior art by providing a device for illuminating a flat surface by a microprism guide, said microprisms being structured in a plane face of the guide which is substantially parallel to said surface in accordance with an arrangement allowing the emerging rays along the guide to be oriented in uniform grazing incidence towards said surface, which will thus be easier to observe as a result of a reduction in the dazzle effect.

The invention therefore concerns an oriented illumination device for a planar surface by at least one lambertian source by means of a solid optical guide formed of a succession of elementary blocks propagating the light along an axis Oz and including at least one microprism, said guide being made of a material with a high refractive index n. This refractive index defines inside the guide a light propagation cone whose angle of revolution corresponds to critical angle $\theta_c$. The cross section of the guide can have any contour, but has at least one plane angle δ one side of which generates a first plane face of the guide substantially parallel to the surface to be illuminated and the other side of which generates a second plane face substantially perpendicular to the surface to be illuminated. The other surfaces generated by the other parts of the cross section can also contribute to improving the extraction of the injected light, for example in accordance with the techniques explained in the preamble, but their configuration does not directly concern the invention.

The invention is characterised in that the microprisms are structured in a hollow on the first face of the guide substantially parallel to the surface to be illuminated and in that each microprism has one of its plane facets oriented towards the light source by being inclined towards the second plane face of the guide so as to orient the middle ray emerging from said second face at an angle $\theta_1$, with respect and towards said surface to be illuminated. The inclination of this facet of the microprism concerned is defined on the one hand by an angle $\vec{\alpha}$ determined in the plane of the first face of the guide by an edge of said facet and by the axis of propagation Oz of the light in an elementary block, and on the other hand, by an angle $\vec{\gamma}$ determined in the plane of the second face of the guide by the edge of said facet and by the direction perpendicular to the surface to be illuminated. Angles $\vec{\alpha}$ and $\vec{\gamma}$ are determined, on the one hand from the refractive index n of the material used for the guide which will determine inside the guide the angle $\theta_c/2$ of the incident middle ray on the microprism facet and on the other hand, from the average angle of incidence $\theta_1$, selected so that the emerging rays illuminate the whole of the surface in question. This average angle of incidence $\theta_1$ is obviously a function of the selection made for the respective dimensions of the guide and said surface to be illuminated, and finally of the value of the plane angle δ of the cross-section of the guide.

The values of angles $\vec{\alpha}$ and $\vec{\gamma}$ can also be calculated, as a function of the aforecited physical characteristics of the device, from derived parameters, such as the direction cosines of the reflected or refracted light rays, said values being carried over in a orthogonal universal set x, y, z parallel to the cross-section of each microprism and to the surface to be illuminated.

It is possible to give plane angle δ of the guide cross-section at each microprism any value one wishes, the preferred value being Π/2, this value also being retained for a better understanding of the following detailed description.

Angle δ may vary with respect to this reference value (Π/2) by approximately −10° (trigonometric direction), either by keeping the first surface strictly parallel to the surface to be illuminated, or by keeping the second surface strictly perpendicular to the surface to be illuminated. In other words, angle δ may vary substantially between 80° and 100°.

As indicated previously, the guide may be considered, for a better understanding of the invention, as a succession of rectilinear elementary blocks B, able to include one or more microprisms as defined above, and the linking of which can either form any longitudinal line, or a rectilinear line, or a regular curved line, such as a circle. In the case of a curved line, angle $\vec{\alpha}$ is defined with respect to the tangent of the point of the guide being considered.

In order to obtain uniform illumination of the surface along the guide, in which there exists a reduction in intensity of the light flux because of the ejected light, but also because of losses due to reflections, absorption by the <<non active>> faces, as well as absorption by the material used to form the guide itself, it is desirable, according to a preferred embodiment of the invention, to compensate for this reduction in light flux by increasing the density of the microprisms as one moves away from the light source.

According to a first preferred embodiment, the microprisms are structured over the entire width of the guide and the number thereof by elementary block $B_i$ increases as one moves away from the light source. The closest elementary block to the light source will for example include one microprism, and the one furthest away will include four.

According to a second preferred embodiment, each elementary block $B_i$ includes only one microprism, but the length of the microprisms increases the further they are from the light source.

These two embodiments are of course compatible with each other, and it is possible to implement them both simultaneously.

The microprisms are formed on the first face of the guide by direct or indirect engraving, such as mechanical machining with suitable diamond tipped tools, etching through photoresist masks, by chemical means or by laser beams, said techniques being cited by way of non-limiting examples.

It is also possible to produce said microprisms by replicating from an engraved die which is fitted to an injection moulding machine to obtain the guides by moulding, or which is used for stamping a surface in which one wishes to make said microprisms. Whichever technique is used, the microprisms can be made either directly on the guide, or on a refractive index plate substantially identical to that of the guide and having the same contour as the first face of the guide, said plate being then applied onto said first face, for example by means of an adhesive material.

The microprisms thus formed can be left as they are, i.e. not.undergo any additional treatment, and change the direction of the light vector simply by total internal reflection. As a function of their angle of incidence, the rays which would exit the guide by refraction on said facet can be reoriented inside the guide as a function of the inclination which has been given to the second facet of each microprism.

According to an alternative embodiment which allows the light flux used for illuminating the surface to be increased, it is also possible to coat the facet of each microprism oriented towards the light source with a reflective coating. This advantage is however offset by the resulting increased manufacturing cost (selective coating of a very small surface) and by the losses in light flux due to absorption by the reflective surfaces. If the surface where the microprisms are structured is completely coated, the increase in manufacturing costs is slightly reduced, but the losses by absorption of the reflective surfaces is also increased. The choice between these different embodiments thus essentially depends on the respective dimensions of the guide, the microprisms and the surface to be illuminated.

As regards the positioning of the light source, it can be selected from those known in the prior art, with a source along the axis of the guide, or better, with two sources arranged at each end, the guide then having a symmetrical microprism structuration with respect to its median point. It is also possible and economically advantageous to arrange a single source perpendicular to the surface to be illuminated facing a dihedron formed in the first face of the guide substantially parallel to the surface to be illuminated, said dihedron having an angle such that it allows the light flux to be injected by total internal reflection into two half-sectors of the guide. The emission cone of the source being formed of light rays having different angles of incidence and able to be refracted, and thus lost, according to another aspect of the invention the aforementioned dihedron is replaced by a double dihedron, or a polydihedron forming a curved surface by a succession of infinitesimal elements.

The microprism illumination device which has just been described allows any type of surface to be illuminated. However, its preferred application is the illumination of surfaces of small dimensions such as the display devices of measuring apparatus and timepiece dials.

Other features and advantages of the present invention will appear in the following description of various embodiments, with reference to the annexed drawings, in which:

FIGS. 3A and 3B show projections of the microprism of FIG. 2 respectively in planes xz, yz and in a plane perpendicular to an edge of the microprism:

FIG. 3C shows the reflection of a ray onto a microprism;

FIG. 4 is a perspective view of an illumination device according to the invention in which the optical guide is a rectilinear bar of rectangular cross-section;

FIG. 4A is a schematic cross-sectional diagram of FIG. 4, perpendicular to the guide axis;

Figure 1:
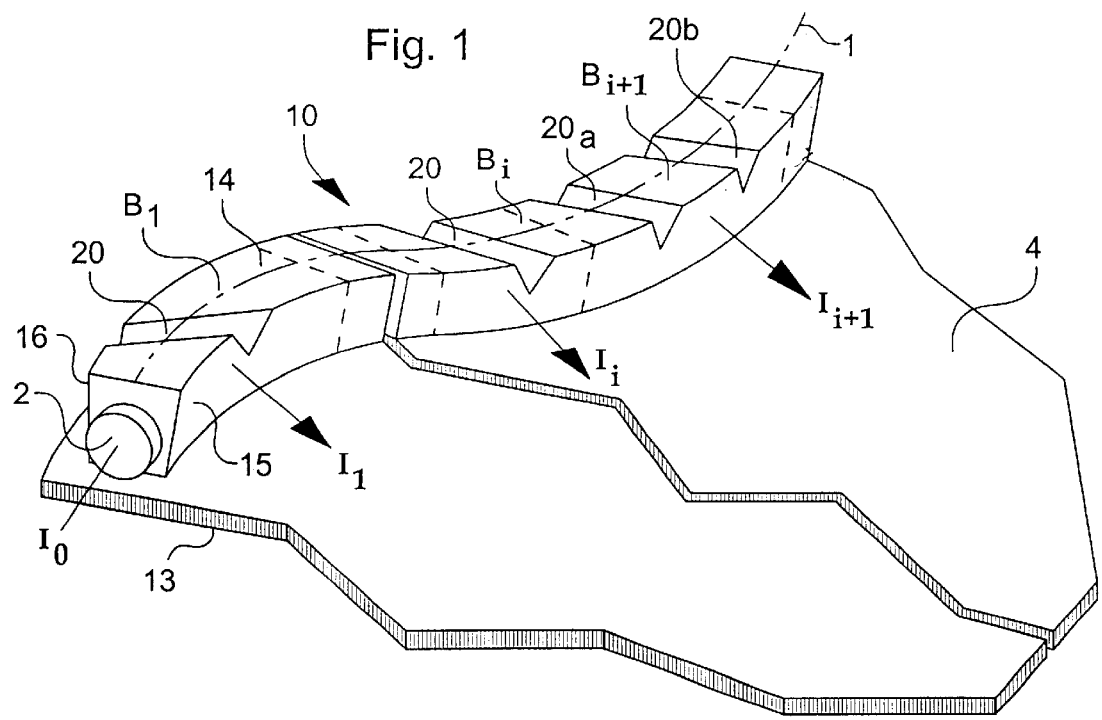
FIG. 1 is a partial perspective diagram of an illumination device according to the most general embodiment of the invention.

FIG. 1 shows schematically and in perspective, a fraction of an illumination device for a plane surface 4 by a solid optical guide with microprisms, designated by the general reference 10, by means of a light source 2 arranged at one of its ends.

The material forming the guide is a translucent material with a high refractive index n, comprised between 1.40 and 1.65, selected from among well known organic polymers which, via total internal reflection (TIR), allow at least a portion of the luminous energy entering at one end from a light source to propagate along the guide. Such organic polymers are for example chosen from acrylic polymers, in particular, polymethylmethacrylate (PMMA), polycarbonate and polyesters.

Light source 2 is a quasi-point Lambertian source such as a AlGaAs diode emitting at 650 nm at a voltage of 1.65 V or a InGaN diode emitting at 470 nm at a voltage of 3.5 V.

Guide 10 extends above surface 4 along a longitudinal line 1, shown in dotted lines, able to have any shape. It may be considered as a succession of rectilinear bar-shaped elementary blocks $B_1, \ldots B_i, B_{i+1} \ldots$ like the one shown in larger scale in FIG. 2.

Each elementary block $B_i$ includes at least one dihedron with a plane angle δ a first face 14 of which is substantially parallel to surface to be illuminated 4 and a second face 15 of which is substantially perpendicular to said surface 4. Surfaces 16 and 17 which join faces 14 and 15 of each elementary block $B_i$ to constitute the envelope thereof could have any shape given that they do not directly participate in the orientation of the grazing incident emergent rays onto surface 4 to be illuminated.

Figure 2:
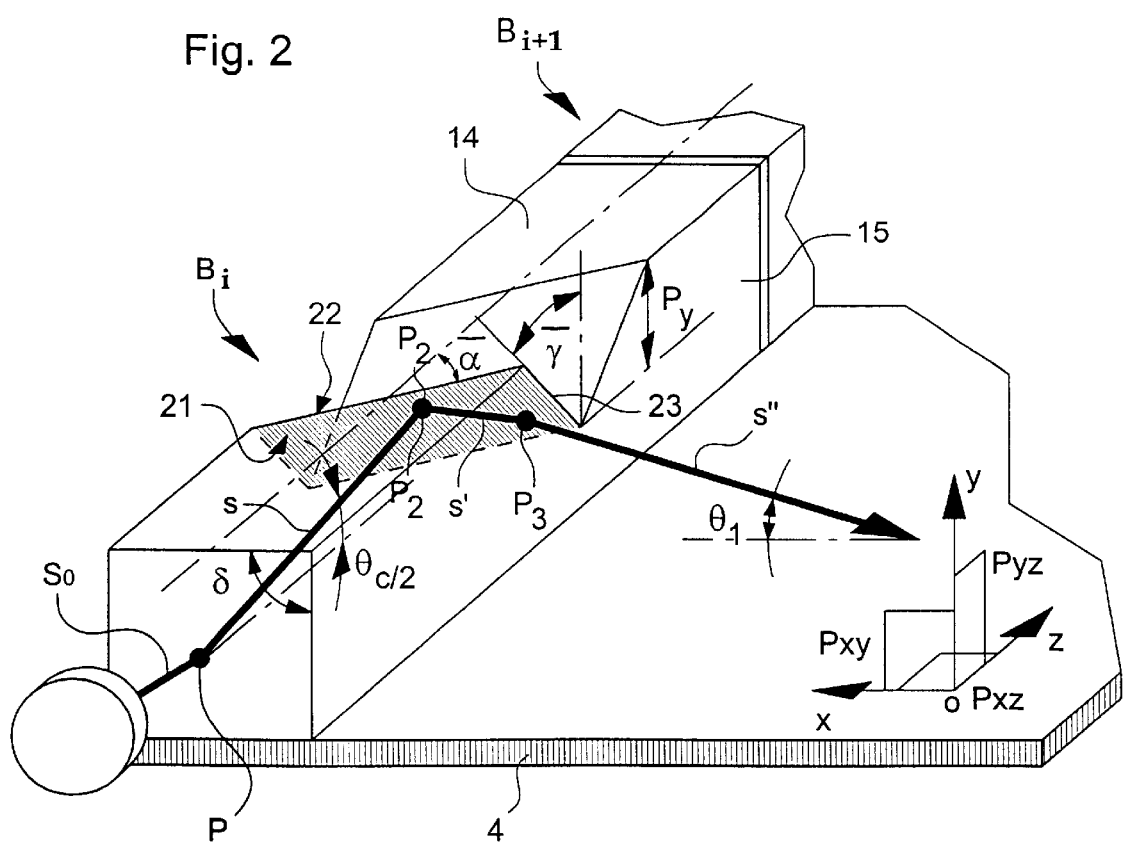
FIG. 2 is an enlarged perspective diagram of one of the blocks forming the guide of the device shown in FIG. 1.

As will be explained in more detail hereinafter, this orientation of the emergent rays is obtained as a result of one or more microprisms 20, 20a, 20b, . . . structured in hollows on first face 14 of each elementary block $B_i$ one first facet 21 of which is directed towards the light source, and another second facet 25 is directed relative (i.e. symmetrical to the first facet with respect to the cross-section of the guide) to facet 21 as shown in FIG. 2. The orientation of this facet 21 is determined precisely, as will be shown hereinafter by way of example, by the choices made as regards the material used for the guide, and more precisely the value of refractive index n of said material, as regards the shape of the cross-section of the guide, and more precisely the value of plane angle a of the dihedron and as regards the extent of the surface to be illuminated, i.e. angle $θ_1$ at which one wishes the emergent rays to strike said surface 4. This precise orientation of facet 21 may be determined from the afore-cited parameters, which will allow calculation, on the one hand, of angle $\vec{\alpha}$ formed in the plane of first face 14 of the guide by edge 22 of facet 21 of the microprism in question and by axis Oz of the propagation of light in the corresponding elementary block, and on the other hand by angle $\vec{\gamma}$ formed in the plane of second face 15 of the guide by edge 23 of facet 21 and by direction Oy perpendicular to the surface to be illuminated.

Angles α and γ can also be expressed from direction cosines K, L, M of the perpendicular to said facet, said direction cosines themselves being calculated from said parameters n, δ and $θ_1$, as explained by way of example hereinafter.

Each elementary block of the guide has a square cross-section of 1.5 mm in width, (the parameter δ than has a value Π/2), and is made of PMMA of refractive index n=1.49. This block is marked in an x, y, z referential in which axis z is parallel to the longitudinal axis of the block, plane xz is parallel to surface 4 to be illuminated and plane xy is parallel to the cross-section. The light emitted by source 2 penetrates the block forming a cone of critical angle $θ_c$=arcsin (1/n)= 42,20° of which only the upper semi-cone will be used hereinafter, assuming that the rays of the lower semi-cone do not directly strike facet 21. This semi-cone allows a median ray $\vec{S}$ to be defined, shown in plane yz, and thus forming an angle of $θ_c/2$=21.1°. The vector representing light ray $\vec{S}$ which will afterwards be reflected by facet 21 of the microprism reflected in a ray $\vec{S}'$ has thus for direction cosines:

$$\vec{s} = \begin{Bmatrix} 0 \\ \sin 21,1° \\ \cos 21,1° \end{Bmatrix} = \begin{Bmatrix} 0 \\ 0,36 \\ 0,933 \end{Bmatrix}$$

The meridian emergent rays exiting guide $\vec{S}''$, which corresponds to ray $\vec{S}''$ after refraction is also required to be in a plane parallel to plane xy and to form an angle $θ_1$=10° with surface 4 to be illuminated. Angle $θ'_1$ (not shown) formed by incident ray $\vec{S}'$ inside the guide is thus:

$$θ'_1 = \left(\frac{\sin(-10°)}{n}\right) = -6,69°,$$

which corresponds in the trigonometric direction to an angle of +173.31°. As a result, vector $\vec{S}'$ has as direction cosines:

$$\vec{s} = \begin{Bmatrix} \cos 353,31° \\ \sin 353,31° \\ 0 \end{Bmatrix} = \begin{Bmatrix} -0,993 \\ +0,117 \\ 0 \end{Bmatrix}$$

By knowing the parameters of incident ray $\vec{S}$ and ray $\vec{S}'$ reflected by facet 21, it is thus possible to calculate direction cosines K, L, M of vector $\vec{r}$ perpendicular to facet 21, by applying the vectorial law of reflection $\vec{s}' = \vec{s} - 2a\vec{r}$, in which a represents $$a = \frac{kK + lM + mM}{K^2 + L^2 + M^2},$$

k, I, m and K, L, M being respectively the direction cosine of vectors $\vec{s}'$ and $\vec{r}$.

The direction cosines of vector $\vec{r}$ perpendicular to the surface of facet 21 can thus be determined as being equal to:

$$\vec{r} = \begin{Bmatrix} K \\ L \\ M \end{Bmatrix} = \begin{Bmatrix} 0,688 \\ 0,33 \\ 0,646 \end{Bmatrix}$$

Referring more particularly to FIG. 3A, it can be seen that angle $\vec{a}$, which represents the inclination of edge 22 of the microprisms along the guide, corresponds to the angle formed by the projection of perpendicular vector $\vec{r}$ in plane xz and thus, in the trigonometric direction, has the value:

$$\bar{a} = \arccos\left(\frac{K}{\sqrt{K^2 + M^2}}\right) = 43,21°$$

Likewise, referring more particularly to FIG. 3B, it can be seen that angle $\vec{\gamma}$, which represents the inclination of edge 23 of the microprisms on face 15 of the guide, corresponding to the angle formed by the by the projection of perpendicular vector $\vec{r}$ in plane xz and thus, in the trigonometric sense, has the value:

$$\bar{\gamma} = \arccos\left(\frac{M}{\sqrt{L^2 + M^2}}\right) = 27,04°$$

In order to completely define the geometry of the guide, the depth Py of the microprisms also has to be selected. If Ly is the height, it is desirable, to avoid a shadow effect, to have the relationship $$\frac{Py}{Ly} \leq \frac{1}{10},$$

which has not been respected in

FIG. 3b for a better understanding of the drawing. In the example chosen (bar of cross-section 1.5×1.5 mm²), the depth should thus not exceed 150 µm.

Referring now more particularly to FIG. 4, a portion of an illumination device is shown with a rectilinear PMMA guide of square cross-section 2×2 mm, and with a length of 50 mm, the microprisms being structured in accordance with the preceding characteristics in 30 elementary blocks of length $\Delta z=1$ mm, the first block being positioned at 10 mm from the source. The density of the microprisms, i.e. the mean number of microprisms per elementary block increases from value 1 for the first block to value 4 for the last block so that there are a total of 56 microprisms. The precise distribution of these microprisms along the guide can be determined by taking account of the absorption coefficient of PMMA (0.000228 mm$^{-1}$) and by assuring that the luminous energy $I_i$ emitted by each elementary block $B_i$ is the same for all the blocks forming the guide. With the illumination device, the decoupling of the luminous flux by each face of the guide was measured by means of energy sensors:

- l−x: flux emerging from face 15 and allowing surface 4 to be illuminated,
- l+x: flux emerging from face 16 opposite face 15,
- l−y: flux emerging from face 13 opposite face 14 including the microprisms,
- l+y: flux emerging from face 14 including the microprisms,
- l−z: flux emerging from face 17 at the entry of the guide where the light source is arranged,
- l+z: flux emerging from face 18 at the other end of the guide.

In a first experiment, none of the guide surfaces include a reflective coating.

In a second experiment, an aluminium coating was deposited on facets 21 of the microprisms.

In a third experiment, the deposition of the aluminium coating was performed across the whole of the first surface 14, including facets 21 of the microprisms.

The results of these three experiments are shown in the table below, indicating by way of reference the results observed with a bar having the same characteristics (refractive indices and guide geometry), but without any microprisms and without any reflective coating.

Compared to the reference, it will be noted that the decoupling value l−x is increased and that this increase is accentuated when the microprisms also have a reflective coating. It will be observed however that the total emerging flux significantly decreases when there is a reflective coating.

In the second experiment one also measured, via a suitable arrangement of the sensors, the quantity of energy $l-x_1$ i directed towards surface 4 to be illuminated and the quantity $l-x_2$ directed towards a top surface 8 parallel to surface 4, as is shown in FIG. 2A, in decoupling value l−x.

For $l-x_1$ the value 52.33% was obtained, and for $l-x_2$ the value 3.71% was obtained, which shows that the particular arrangement of the microprisms according to the invention significantly contributes to orienting the light rays emerging from face 21 of the guide towards the surface to be illuminated.

Figure 5:
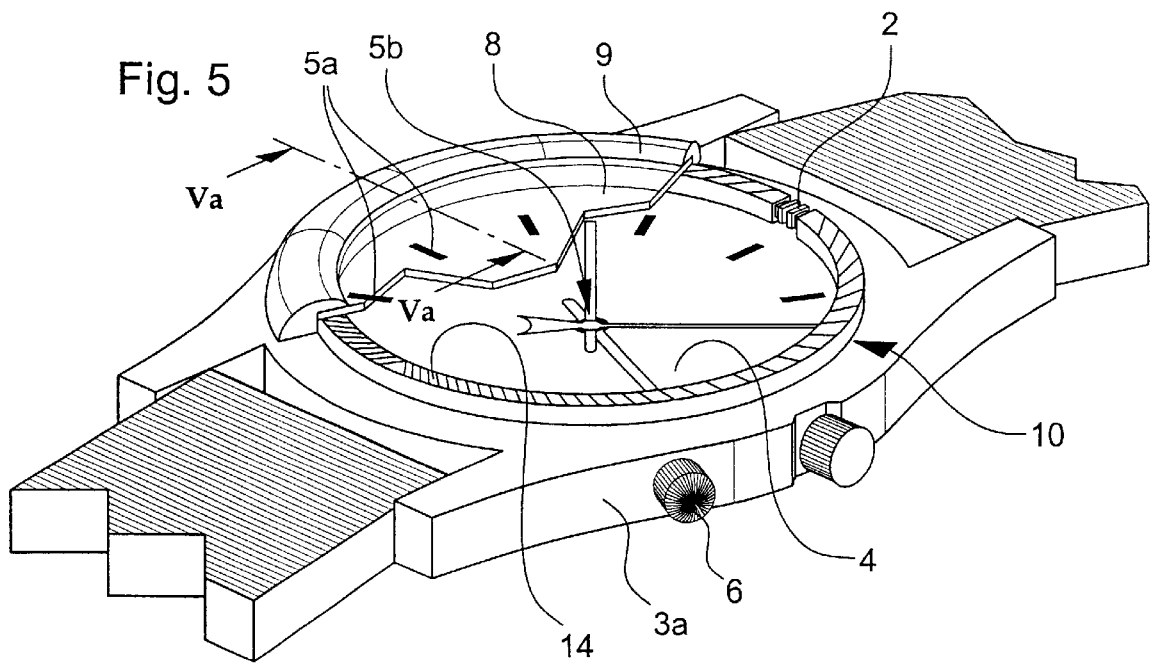
FIG. 5 is partially torn away perspective view of a watch provided with an illumination device according to the invention in which the guide is ring-shaped.
Figure 5A:
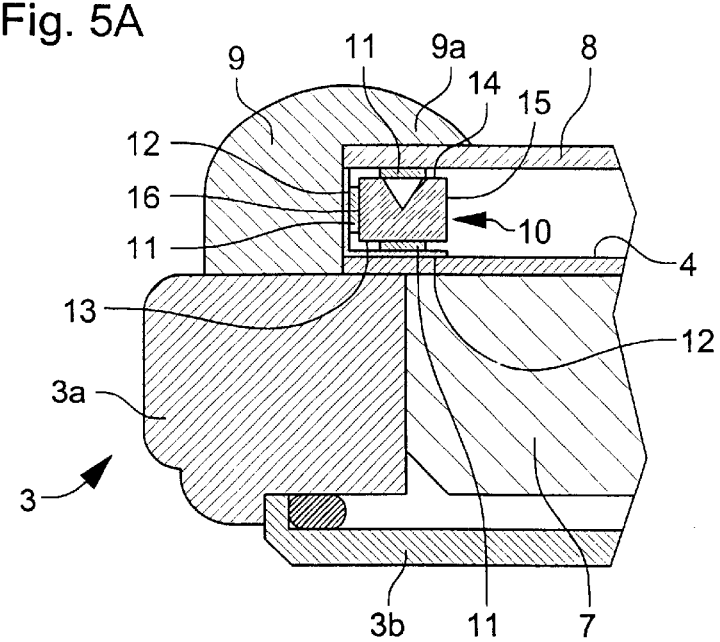
FIG. 5A is a cross-section along the line Va—Va of FIG. 5.

Referring now to FIGS. 5 and 5A, the application of an illumination device oriented according to the invention for lighting a common type of wristwatch dial is shown. It includes a case 3 of circular shape, formed by a middle part 3a sealed by a back cover 3b and containing a clockwork movement and a light source 7 supplying at least the illumination device. The time display is performed on a dial 4, for example in analogue mode by means of hands 5a and by means of time indications 5b arranged on the periphery of dial 4. The display is sealed by a crystal 8 held in place by a bezel 9 an extension 9a of which partially covers a ring of said crystal 8 and dial 4., while being secured to the case by any suitable means. The portion in which crystal 8 and bezel 9 have partially been torn away shows optical guide 10, of annular shape with a rectangular cross-section, housed in the space delimited by a bezel 9 and the opposite faces of dial 4 and crystal 8. As appears more clearly in FIG. 3A, guide 10 is held in its housing by spacers 11, arranged at intervals so as to arrange a small air gap between surfaces 13, 14 and 16 of the guide and the opposite walls. Mirror surfaces 12 have also been arranged opposite inactive faces 13 and 16 to reflect the rays which would exit the guide. These mirror faces are for example made of silver coated PET sheets.

As shown in FIG. 5, the guide has, substantially at the 12 o'clock position, an interruption forming a housing for accommodating a light source 2, formed by two diodes arranged back-to-back, said light source being able for example to be switched on as required by activating a push-button 6 arranged on middle part 3a.

The top face 14 of the guide includes microprisms such as those described previously and whose angle of inclination $\vec{\alpha}$ in the plane zx is defined from a tangent to the circular ring forming the guide.

As can be seen, the microprisms are then distributed symmetrically with respect to the 6 o'clock–12 o'clock axis and their density increases progressively as one comes closer to the 6 o'clock position.

| Experiment | I − x | I + x | I − y | I + y | I − z | I + z | total emerging I |
|---|---|---|---|---|---|---|---|
| 1 | 44.11% | 6.03% | 10.58% | 6.76% | 7.70% | 21.75% | 96.93% |
| 2 | 56.04% | 5.25% | 9.38% | 1.22% | 8.39% | 10.53% | 90.81% |
| 3 | 47.69% | 3.63% | 6.60% | 0.35% | 7.82% | 7.47% | 73.56% |
| reference* | 15% | 15% | 15% | 15% | 10% | 30% | 100% |

(*given the small length of the guide, the absorption losses are negligible)

Figure 6:
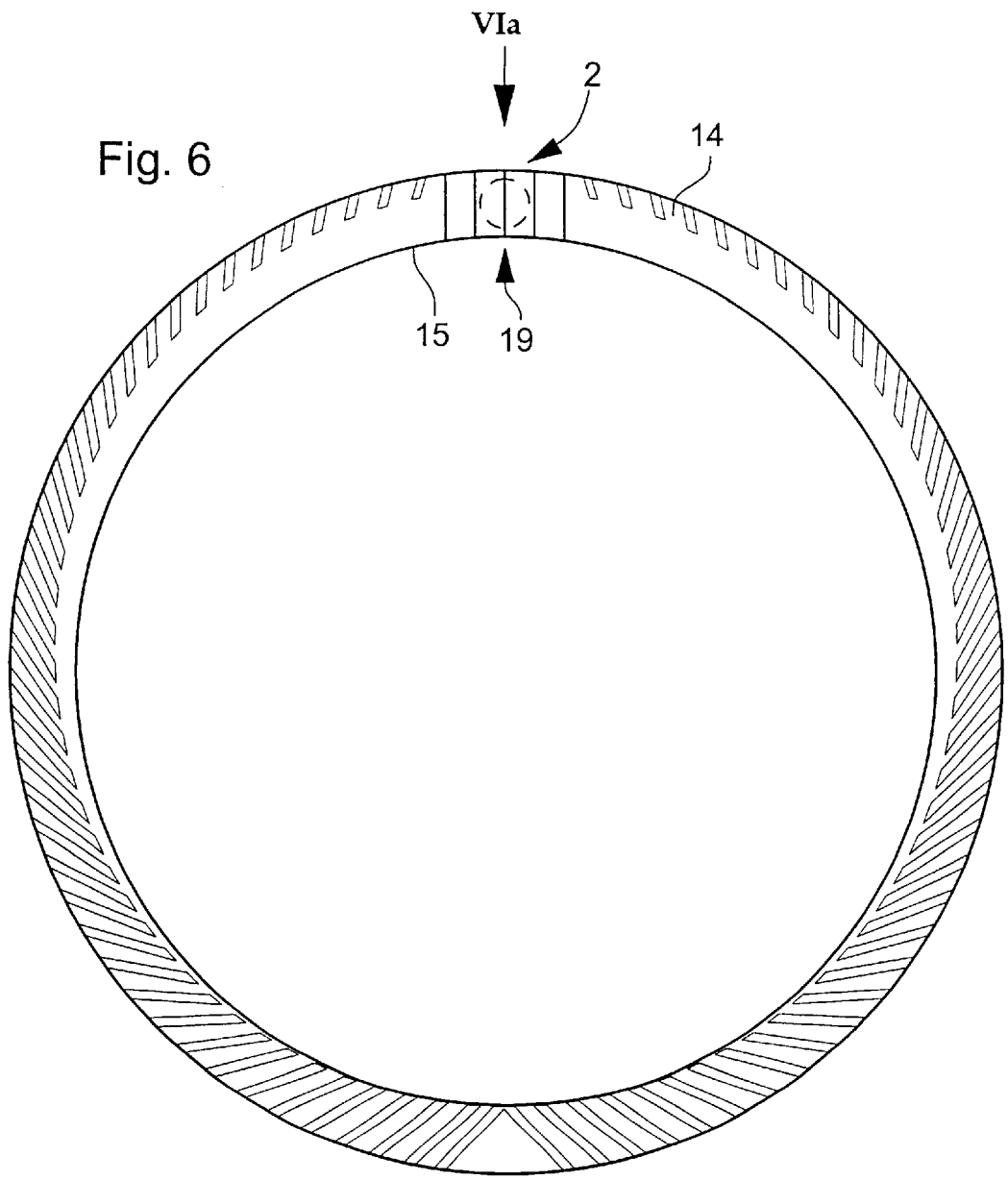
FIG. 6 is a top view of another embodiment of the guide shown in FIG. 5.
Figure 6A:
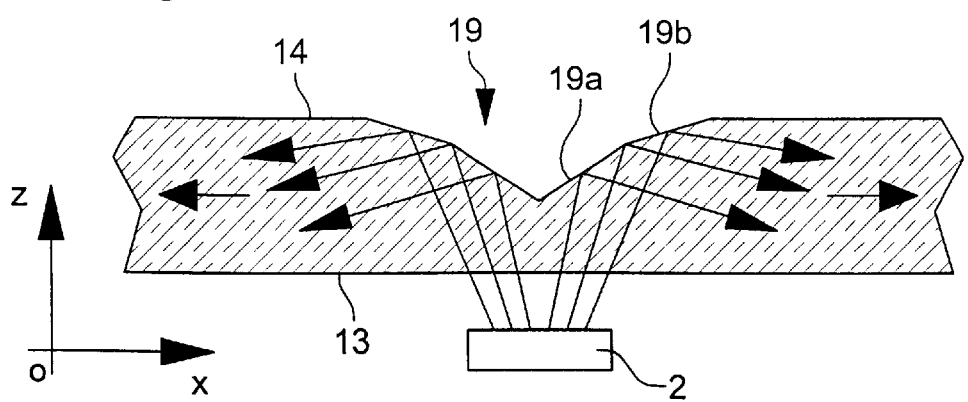
FIG. 6A is a side view along the arrow Vla of the guide of FIG. 6 in the vicinity of the light source.

FIG. 6 shows a top view of an embodiment of an annular guide also able to be used to illuminate a watch dial, and in which the microprisms are regularly spaced, but have a length which increases from the exterior towards the interior, i.e. towards the surface to be illuminated, progressively as one moves away from light source 2. According to another characteristic of this embodiment the light source is formed by a single diode arranged along axis Oy facing face 13 opposite face 14 including the microprisms and said face 14 includes a dihedron cut out 19 at an angle such that the incident beam is decoupled by total internal reflection into two half-beams injected into two half-portions of the guide. The side view shown in FIG. 6A corresponds to this embodiment in which dihedron 19 is in fact a double dihedron in which each face is formed of two facets 19a and 19b of different orientation and which thus allow the dispersion of the rays originating from the light source to be better taken into account.

Figure 7:
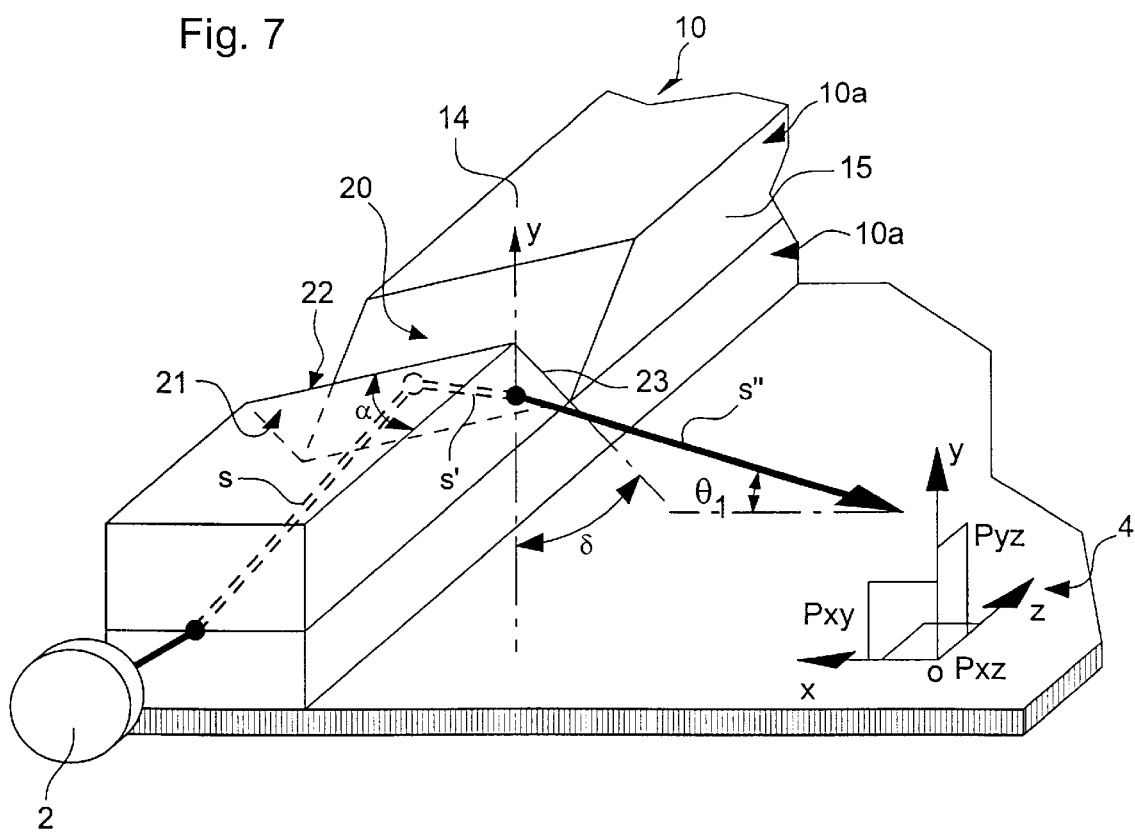
FIG. 7 is a modification of the device of FIG. 2, according to the present invention.

FIG. 7 illustrates yet another embodiment of the present invention, being a modification of the embodiment shown in FIG. 2, wherein like numerals indicate like parts. FIG. 2 illustrates the invention according to a first preferred embodiment, wherein the microprisms are structured over the entire width of the guide 10 and the number thereof by elementary block $B_i$ increases as one moves away from the light source 2. The closest elementary block to the light source 2 will for example include one microprism, and the furthest away will include four microprisms.

As will be understood, the embodiment examples which have just been described can give rise to numerous variants, without departing from the scope of the invention.

What is claimed is:

1. An oriented illumination device for a plane surface comprising:

at least one lambertian light source for producing beams that enter a solid optical guide with microprisms extending along an axis Oz with a constant cross-section, said guide being made of a material with a high refractive index n, to which a critical angle $\theta_c$ corresponds, said cross section having at least one place angle $\delta$ one side of which generates a first plane face of the guide substantially parallel to the surface to be illuminated and the other side of which generates a second plane face substantially perpendicular to said surface, wherein the microprisms are formed of two facets structured in hollows on the first face and wherein one facet oriented towards the light source is inclined towards the second face so that a median beam emerging from said second face strikes the surface at an angle $\theta_1$, said inclination being defined on the one hand by the angle $\vec{\alpha}$ defined in the plane of the first face by an edge of the microprism and by the axis Oz at the microprism in question, and on the other hand by the angle $\vec{\gamma}$ defined in the plane of the second face by the edge of said one facet and by the direction Oy perpendicular to the surface to be illuminated, angles $\vec{\alpha}$ and $\vec{\gamma}$ being determined from the characteristics n, $\theta_1$ and $\delta$ retained for the illumination device.

2. An illumination device according to claim 1, wherein the angles $\vec{\alpha}$ and $\vec{\gamma}$ are determined from direction cosines K, L, M of the perpendicular to said one facet of the microprisms, said direction cosines being themselves calculated from the parameters n, $\theta_1$ and $\delta$.

3. An illumination device according to claim 1, wherein one or the other or both of the first face with microprisms and the second face of the guide have an inclination varying from 0° to −10° with respect to a preferred position in which they form a plane angle $\delta=\Pi/2$, said faces being then respectively parallel and perpendicular to the surface to be illuminated.

4. An illumination device according to claim 3, wherein the angle of inclination $\vec{\alpha}$ has the value 47° and the angle of inclination $\vec{\gamma}$ has the value 27° when the material forming the guide is PMMA with a refractive index of n=1.49 and one selects $\theta_1$=10°.

5. An illumination device according to claim 3, wherein the cross-section of the guide is a four-sided rectangle.

6. An illumination device according to claim 1, wherein the longitudinal line Oz of the guide is a rectilinear line, the angle $\vec{\alpha}$ being then defined with respect to said rectilinear line.

7. An illumination device according to claim 1, wherein the longitudinal line of the guide is a circular line, the angle $\vec{\alpha}$ then being defined with respect to a tangent at the point of curvature of the microprism in question.

8. An illumination device according to claim 1, wherein the number of microprisms per unit of length increases progressively as one moves away from the light source.

9. An illumination device according to claim 1, wherein the microprisms are regularly distributed along the guide, but have a length which increases from the exterior towards the surface to be illuminated progressively as one moves away from the light source.

10. An illumination device according to claim 1, wherein a second facet of the two facets of each microprism is perpendicular to the surface to be illuminated.

11. An illumination device according to claim 1, wherein a second facet of the two facets of each microprism is symmetrical to the one facet with respect to the cross-section of the guide.

12. An illumination device according to claim 1, wherein at least the one facet of each microprism is coated with a reflective coating.

13. An illumination device according to claim 1, wherein the microprisms are formed by direct or indirect engraving by means of mechanical machining, or etching through masks by chemical processes or laser beams.

14. An illumination device according to claim 13, wherein the microprisms are formed directly in the material forming the guide.

15. An illumination device according to claim 13, wherein the microprisms are formed on a plate of a material having an identical or close refractive index to that of the guide, said plate being then applied onto the first face of the guide.

16. An illumination device according to claim 1, wherein the microprisms are obtained from a die allowing said microprisms to be formed by injection into a mould incorporating said die or by using said die to stamp a surface.

17. An illumination device according to claim 16, wherein the microprisms are formed directly in the material forming the guide.

18. An illumination device according to claim 16, wherein the microprisms are formed on a plate of a material having an identical or close refractive index to that of the guide, said plate being then applied onto the first face of the guide.

19. An illumination device according to claim 1, wherein the guide is formed by an organic polymer material having a refractive index n comprised between 1.40 and 1.65.

20. An illumination device according to claim 1, wherein the light source is formed by two diodes arranged back-to-back along the axis Oz of the guide.

21. An illumination device according to claim 1, wherein the light source is formed by a single diode arranged along the axis Oy facing the face opposite said first face including the microprisms and in that said first face includes a cut in a dihedron or polydihedron shape allowing the light beam to be separated into two semi-halves of the guide.

22. An illumination device according to claim 1, wherein the median beam emerges along the guide oriented in a grazing incidence towards the plane surface thereby reducing the dazzle effect.

23. A timepiece including a case intended to accommodate a clockwork mechanism, said case being sealed by a crystal arranged above a dial for the analogue or digital display of the time, wherein the dial is illuminated by an illumination device for a plane surface comprising:

at least one lambertian light source for producing beams that enter a solid optical guide with microprisms extending along an axis Oz with a constant cross-section, said guide being made of a material with a high refractive index n, to which a critical angle $\theta_c$ corresponds, said cross section having at least one plane angle $\delta$ one side of which generates a first plane face of the guide substantially parallel to the surface to be illuminated and the other side of which generates a second plane face substantially perpendicular to said surface, wherein the microprisms are formed of two facets structured in hollows on the first face and wherein one facet oriented towards the light source is inclined towards the second face so that a median beam emerging from said second face strikes the surface at an angle $\theta_1$, said inclination being defined on the one hand by the angle $\vec{\alpha}$ defined in the plane of the first face by an edge of the microprism and by the axis Oz at the microprism in question, and on the other hand by the angle $\vec{\gamma}$ defined in the plane of the second face by the edge of said one facet and by the direction Oy perpendicular to the surface to be illuminated, angles $\vec{\alpha}$ and $\vec{\gamma}$ being determined from the characteristics n, $\theta_1$ and $\delta$ retained for the illumination device.

* * * * *